US008005736B2

(12) United States Patent
Botzer et al.

(10) Patent No.: US 8,005,736 B2
(45) Date of Patent: *Aug. 23, 2011

(54) MULTI-LEVEL TRANSACTION FLOW MONITORING

(75) Inventors: David Botzer, Haifa (IL); David Oren, Haifa (IL); Tali Yatzkar-Haham, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,776

(22) Filed: Dec. 15, 2009

(65) Prior Publication Data

US 2011/0004538 A1  Jan. 6, 2011

Related U.S. Application Data

(63) Continuation of application No. 11/189,356, filed on Jul. 26, 2005, now Pat. No. 7,698,186.

(51) Int. Cl.
*G06Q 40/00* (2006.01)
(52) U.S. Cl. ............................................. 705/35; 705/37
(58) Field of Classification Search ............... 705/35–36, 705/37
See application file for complete search history.

(56) References Cited

U.S. PATENT DOCUMENTS

| 5,873,094 | A | 2/1999 | Talatik |
| 6,105,087 | A | 8/2000 | Rivoir |
| 6,249,755 | B1 | 6/2001 | Yemini et al. |
| 6,349,298 | B1 | 2/2002 | Malone et al. |
| 6,665,648 | B2 * | 12/2003 | Brodersen et al. ................. 705/7 |
| 2002/0091533 | A1 | 7/2002 | Ims et al. |
| 2002/0103663 | A1 | 8/2002 | Bankier et al. |
| 2002/0161859 | A1 | 10/2002 | Willcox et al. |
| 2002/0163427 | A1 | 11/2002 | Eryurek et al. |
| 2003/0004744 | A1 | 1/2003 | Greene et al. |
| 2003/0050789 | A1 | 3/2003 | Hasson et al. |
| 2003/0055668 | A1 | 3/2003 | Saran et al. |
| 2004/0073436 | A1 | 4/2004 | Vaishnavi |
| 2004/0172445 | A1* | 9/2004 | Singh et al. ................... 709/200 |
| 2005/0096949 | A1 | 5/2005 | Aiber et al. |

OTHER PUBLICATIONS

Duan, Ziyang et al., "A Structured Approach to Trade Negotiation Applications", Proc. of the 15th International Conf. On Computer Applications in Industry and Engineering (CAINE), Nov. 2001, pp. 162-165. Available at http://oldwww.cs.wayne.edu/%7eshiyong/papers/caine02.pdf.

Eshuis, Rik et al., "Animating ebXML Transactions with a Workflow Engine", url= citeseer.ist.psu.edu/699208.html and then choose PDF download.

* cited by examiner

*Primary Examiner* — Thu Thao Havan

(57) ABSTRACT

An apparatus for monitoring transactions in a computer system includes monitoring events reported by components of the computer system responsively to a flow of the transactions through the system. A state machine model and a rule-based model are jointly applied to the monitored events, so as to identify respective transaction-level events and business-level events. A status of the flow of the transactions is assessed responsively to the transaction-level events and the business-level events.

19 Claims, 4 Drawing Sheets

FIG. 5

Query Manager

Details of payments ordered by a specific customer ▼

Customer: BillSteen

Query Result

Query
Transactions waiting manual repair

| TRN | STATE | AMOUNT | ORDER... | BENEFI... | HAD_E... | CREAT... | STATE_... |
|---|---|---|---|---|---|---|---|
| X12E | inManu... | 2000.0 | BillSteen | MattsMY... | 1 | 2003-0... | 2003-0... |
| X130 | inManu... | 10000.0 | SamCl... | BillSteen | 1 | 2003-0... | 2003-0... |
| X134 | inManu... | 3000.0 | Jenniter. | MattsMY... | 1 | 2003-0... | 2003-0... |

FIG. 6

Transaction state

|  | % | # | $value |
|---|---|---|---|
| In Process | 25.64% | 10 | $75,000.00 |
| In Manual Repair | 2.56% | 1 | $5,000.00 |
| In Process After Repair | 5.13% | 2 | $22,000.00 |
| Completed | 66.67% | 26 | $233,000.00 |
| Total | 100.00% | 39 | $335,000.00 |

SLA Violation

|  | # | $value |
|---|---|---|
| In Process | 2 | $22,000.00 |
| In Manual Repair | 0 | $0.00 |

MULTI-LEVEL TRANSACTION FLOW MONITORING

CROSS-REFERENCE TO RELATED APPLICATIONS

This application is a continuation of U.S. patent application Ser. No. 11/189,356, filed Jul. 26, 2005, now U.S. Pat. No. 7,698,186 which is incorporated herein by reference.

FIELD OF THE INVENTION

The present invention relates generally to financial computer systems, and particularly to methods and systems for monitoring the flow of financial transactions.

BACKGROUND OF THE INVENTION

Financial institutions and organizations operate computer systems that process financial transactions. Many of these computer systems employ workflow management or workflow monitoring methods in order to monitor or manage the business process, improve system performance and identify failures.

Some applications use state machine models for managing or monitoring business processes. For example, U.S. Patent Application Publication 2003/0050789 A1 describes a state-based method and apparatus for tracing and auditing a business process managed by a state machine. The system can selectively vary the tracing and auditing based, for example, upon the specific state within the business process or the identity of the organization or user associated with a given transaction.

U.S. Patent Application Publication 2002/0103663 A1 describes a method for processing electronic commerce transaction messages. The transaction type is identified in the message, and the progress of the transaction is tracked using transaction models. Failures in the back-end server system or in the network connections are detected and recovered from using an outcome determination technique.

U.S. Patent Application Publication 2003/0055668 A1 describes a method for executing a workflow in a business computer platform using state machines. A workflow engine receives input messages and implements predetermined finite state machines based on characteristics of the input messages.

Other applications use rule-based models for monitoring or managing the workflow. For example, U.S. Patent Application Publication 2002/0161859 A1 describes a system for integrating multiple resources, using business rules, in a service provider environment. A workflow engine receives service requests from original adapters and sends instructions to receiving adapters to execute the service requests. The system also includes business rules in communication with the workflow engine. The business rules sequentially provide the instructions sent by the workflow engine.

U.S. Patent Application Publication 2002/0163427 A1 describes an events management system that coordinates the exchange of device alert or alarm information within a process control system or plant. The events management system receives device alerts and uses a rules-engine and one or more state machines to send notifications containing device alert information to one of more of the business systems.

SUMMARY OF THE INVENTION

There is therefore provided, in accordance with an embodiment of the present invention, a computer-implemented method for monitoring transactions in a computer system, including monitoring events reported by components of the computer system responsively to a flow of the transactions through the system. A state machine model and a rule-based model are jointly applied to the monitored events, so as to identify respective transaction-level events and business-level events. A status of the flow of the transactions is assessed responsively to the transaction-level events and the business-level events.

In an embodiment, the transactions include financial transactions. In another embodiment, monitoring the events includes exporting the reported events from the components of the computer system to a monitoring system external to the components of the computer system that perform the transactions, so that the external monitoring system applies the state machine model and the rule-based model and assesses the flow of the transactions.

In yet another embodiment, monitoring the events includes at least one of accepting events reported using built-in mechanisms of the components, incorporating one or more monitoring agents into some of the components, and monitoring interfaces between some of the components.

In still another embodiment, applying the state machine model and the rule-based model and assessing the status include at least one of configuring the state machine model, configuring the rule-based model, configuring queries for information and configuring information to be presented to a user, by using a declarative language. In some embodiments, the declarative language includes an extensible markup language (XML).

In an embodiment, applying the state machine model includes defining transaction states representing a status of a monitored transaction in the flow, defining state transitions connecting between the transaction states and defining transaction data including information relating to the monitored transaction.

In another embodiment, defining the state transitions includes, for each state transition, defining a triggering event that triggers the state transition responsively to at least one of the monitored events and the business-level events identified by the rule-based model, and applying the state machine model includes updating the transaction state of the monitored transaction responsively to an occurrence of the corresponding triggering event.

In yet another embodiment, defining the state transitions includes defining a validity check, and updating the transaction state includes generating a transaction lifecycle alert responsively to a failure in the validity check of the corresponding state transition.

Additionally or alternatively, generating the transaction lifecycle alert includes generating at least one of a timeout alert, an event inconsistency alert, an event constraint alert and a data constraint alert.

In still another embodiment, applying the rule-based model includes at least one of detecting service level agreement (SLA) violation, anticipating the SLA violation, detecting a deviation from an expected key performance indicator (KPI) value, anticipating the deviation from the expected KPI value, detecting a problem related to the flow external to the computer system, and identifying a system-level problem in one or more of the components of the computer system.

In an embodiment, applying the rule-based model includes applying a predefined business rule to at least one of the monitored events and the transaction-level events identified by the state machine model, and identifying at least one of the business-level events responsively to the evaluated business rule.

In an embodiment, applying the rule-based model includes identifying at least one of the business-level events responsively to a time-dependent trigger.

In another embodiment, assessing the status includes detecting an undesired condition including at least one of a service level agreement (SLA) violation, an anticipated SLA violation, a hardware problem in one or more of the components, an anticipated hardware problem, a capacity bottleneck in the flow, an anticipated capacity bottleneck, a deviation from an expected key performance indicator (KPI) value and an anticipated deviation from the expected KPI value. Additionally or alternatively, detecting the undesired condition includes generating an alert to a user responsively to the detected condition.

In yet another embodiment, assessing the status includes defining a query using a query template and addressing the query to at least one of the state machine model and the rule-based model for information related to the flow.

In still another embodiment, assessing the status includes at least one of calculating and presenting statistical information related to the flow, and calculating and presenting information relating to a key performance indicator (KPI).

Apparatus and a computer software product for monitoring transactions in a computer system are also provided.

There is additionally provided, in accordance with an embodiment of the present invention, a computer-implemented method for monitoring transactions in a computer system, including exporting events reported by components of the computer system responsively to a flow of the transactions through the system to a monitoring system external to the components of the computer system that perform the transactions. At the monitoring system, a state machine model and a rule-based model are jointly applied to the exported events, so as to identify respective transaction-level events and business-level events. A status of the flow of the transactions is assessed responsively to the transaction-level events and the business-level events.

There is also provided, in accordance with an embodiment of the present invention, a financial transaction processing network, including:

a financial computer system, including components that are arranged to process financial transactions and to report events responsively to a flow of the transactions through the system; and a transaction flow monitor, which is arranged to monitor the events reported by the components of the computer system, to jointly apply a state machine model and a rule-based model to the monitored events, so as to identify respective transaction-level events and business-level events, and to assess a status of the flow of the transactions responsively to the transaction-level events and the business-level events.

The present invention will be more fully understood from the following detailed description of the embodiments thereof, taken together with the drawings in which:

BRIEF DESCRIPTION OF THE DRAWINGS

FIG. 5 is a diagram that schematically illustrates parts of a user interface of a query monitor, in accordance with an embodiment of the present invention; and FIG. 6 is a diagram that schematically illustrates parts of a user interface of a status monitor, in accordance with an embodiment of the present invention.

DETAILED DESCRIPTION OF EMBODIMENTS

Overview

In financial computer systems, it is generally desirable to process the flow of transactions in an efficient, smooth manner that involves minimal human intervention. For example, the Securities Industry Association (SIA) has declared an industry initiative called "straight through processing" (STP). The STP approach, as defined by the SIA, is "the seamless integration of systems and processes to automate the trade process from end-to-end trade execution, confirmation and settlement, without the need for manual intervention or re-keying of data." Additional details regarding the SIA and the STP initiative can be found at www.sia.com/stp.

In order to improve the smoothness and efficiency of the transaction handling process, as required for applying STP, inter alia, it is desirable to monitor the flow of transactions through the financial computer system. Monitoring the transaction flow enables a user, such as an operator of the computer system, to detect and react to events such as performance problems, system component failures and changing client behavior patterns and needs.

Embodiments of the present invention that are described hereinbelow provide improved methods and systems for transaction flow monitoring in financial computer systems. In these embodiments, a transaction flow monitor monitors events reported by components of the computer system. A state machine model and a rule-based model jointly analyze the monitored events to determine respective transaction-level events and business-level events. Thus, the flow of transaction is monitored at two levels—the individual transaction level and the business performance level. In some embodiments, there is close interaction between the operation of the state machine model and the rule-based model.

The transaction-level and business-level events are typically used for generating alerts to the user, for presenting statistical information regarding key performance indicators (KPI) of the system and other status information, and for detecting service level agreement (SLA) violations and anticipated violations. In some embodiments, the user can define and perform queries for specific information.

In some embodiments, the state machine model, the rule-based model and other components of the transaction flow monitor are defined and configured using a declarative language, such as extensible markup language (XML) without the need to write dedicated software code. In some embodiments, the rule-based model can be configured using tools and/or user interfaces that are suitable for a user who is not a programmer.

In many cases, financial computer systems comprise legacy systems and systems comprising components of different vendors. In such embodiments, the transaction flow monitor is typically implemented as an external add-on to an existing computer system.

System Description

Figure 1:
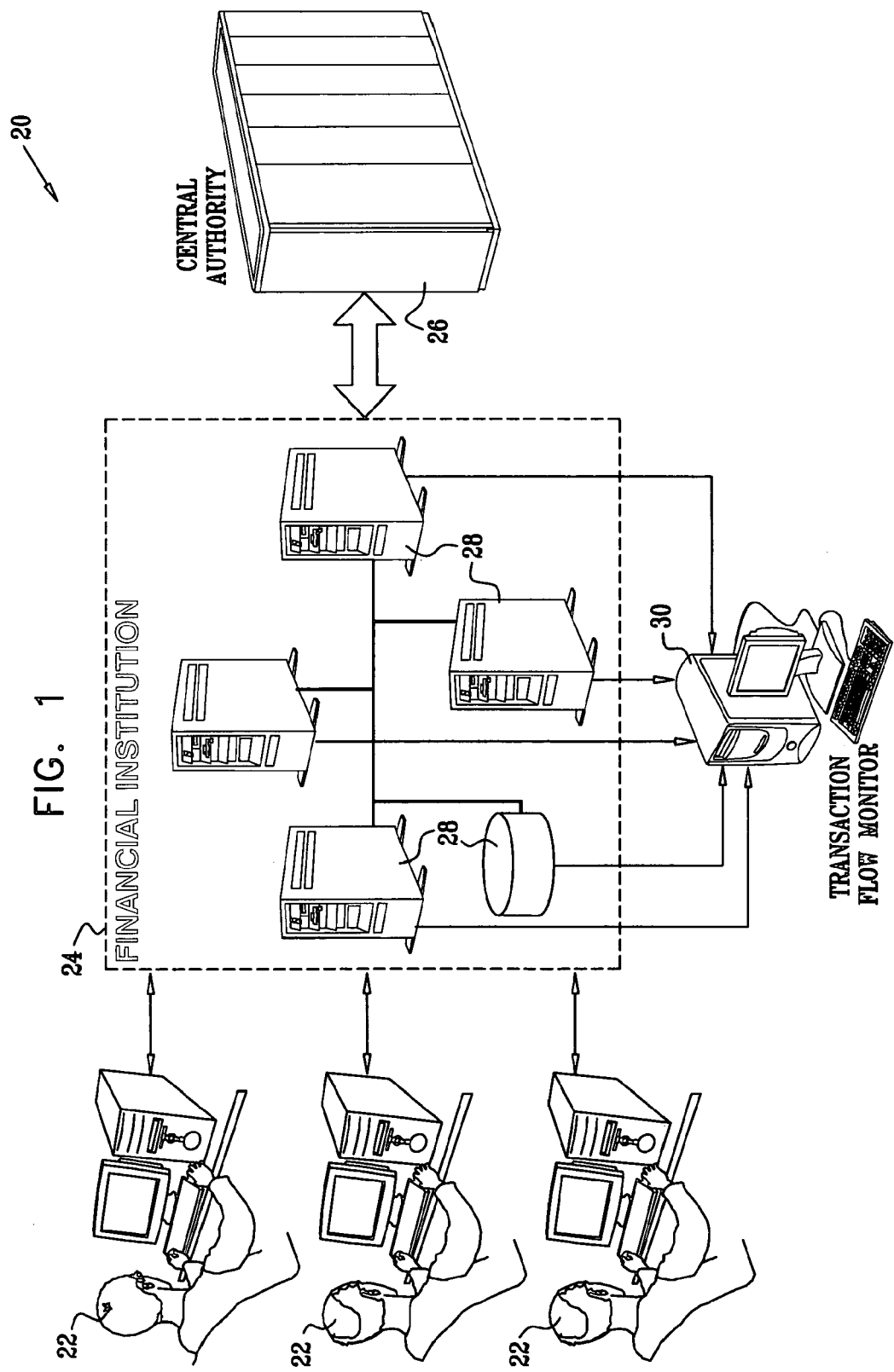
FIG. 1 is a block diagram that schematically illustrates a financial computer system, in accordance with an embodiment of the present invention.

FIG. 1 is a block diagram that schematically illustrates a financial transaction processing network 20, in accordance with an embodiment of the present invention. Clients 22 use network 20 for performing financial transactions vis-à-vis a financial computer system 24 that belongs to a financial institution. Depending on the application, system 24 may be operated by a bank, a stock trading company, a credit card operator or a similar financial institution.

Clients 22 may communicate with system 24 using a temporary or a permanent network connection, such as an Internet connection. Alternatively, clients may connect to system 24 using a direct connection such as a leased line or a dial-up connection, or using any other suitable connection means.

System 24 receives transaction requests from the clients, processes the transactions, and typically returns acknowledgements or other responses to the clients. As part of the transaction processing in system 24, each transaction is typically settled and/or confirmed with a central authority 26. Depending upon the nature of the transactions, the central authority may comprise a computer system of a central bank, a stock exchange, a clearinghouse or a similar organization.

In some embodiments, network 20 may be an electronic retail application network. In such embodiments, system 24 is typically operated by a company that receives orders from clients and issues corresponding orders to suppliers. Central authority 26 in these embodiments comprises a computer system or web-service of a supplier.

System 24 communicates with central authority 26 using a network connection, a dedicated direct connection or any other suitable connection means.

Typically, system 24 comprises multiple system components 28. In general, components 28 comprise software and middleware applications, hardware platforms, storage devices, communication devices, etc. Components 28 of system 24 continuously or periodically monitor the flow of transactions, and generate events that relate to the status of the transaction flow. For example, an event may be generated by an application when a certain transaction enters a queue and waits to be processed, when the number of transactions in a queue is approaching a predefined threshold, or when a certain computing platform is overloaded. Events may also be triggered by hardware failures, and by any other occurrence in components 28 or in the interfaces between them that has an impact on the flow of transactions through system 24.

A transaction flow monitor 30 monitors the different events reported by components 28 of system 24. Monitor 30 correlates the monitored events with information regarding the structure of the business process carried out by system 24 in order to detect problems and anticipated problems in the system. In some embodiments, monitor 30 provides a user, typically a system administrator or other operator of system 24, with real-time information regarding the system performance. Such information comprises, for example, the following:

Violations or anticipated violations of service level agreements (SLAs).
Problems or anticipated problems relating to hardware components or other infrastructure of system 24.
Existing or anticipated capacity bottlenecks in the processing of transactions.
Statistical information relating to key performance indicators (KPI) of system 24.
Alerts indicating deviations or anticipated deviations from the expected values of KPIs.
Low level warnings and alerts, typically relating to specific transactions.
Notification of expected events, such as an approaching end of a business day.

In some embodiments, in addition to providing alerts and status information, monitor 30 also enables the user to perform queries for specific information. Monitor 30 thus enables integrated monitoring of the transaction flow through system 24, providing alerts, status information and answers to queries.

Using the information provided by monitor 30, the user can, for example, promptly react to and resolve performance bottlenecks, perform necessary repair of faulty components, re-configure or re-allocate system resources to match changing resource requirements, and respond to changing client behavior patterns or changing customer needs. An immediate response to such problems and changing conditions typically reduces the number and severity of SLA violations, reduces penalties set for SLA violations and provides an immediate improvement in the business performance of system 24. In some cases, using the monitoring information also enables the user to optimize the resource allocation in the system, thus improving its capacity to handle a larger number of transactions. The improved capacity again improves the business performance of system 24.

Based on the information provided by monitor 30, the user can also identify problems, bottlenecks and sub-optimalities in the definition and structure of the business process and suggest modifications to the process.

In many practical scenarios, system 24 comprises several different applications running on different hardware platforms. Some of the applications may be legacy applications developed over time. In many cases, the system comprises applications and hardware platforms from different vendors. In such embodiments, monitor 30 is typically implemented as an external add-on to an existing computer system. In some embodiments, components 28 report events using their standard built-in mechanisms. In other embodiments, it may be desirable to incorporate dedicated agents into some of components 28, in order to report events to monitor 30. Some events can also be monitored by monitoring the interfaces between components 28.

Typically, transaction flow monitor 30 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, monitor 30 may be implemented using a combination of hardware and software elements. The monitor may be a standalone unit, or it may alternatively be integrated with other computing platforms of system 24.

Figure 2:
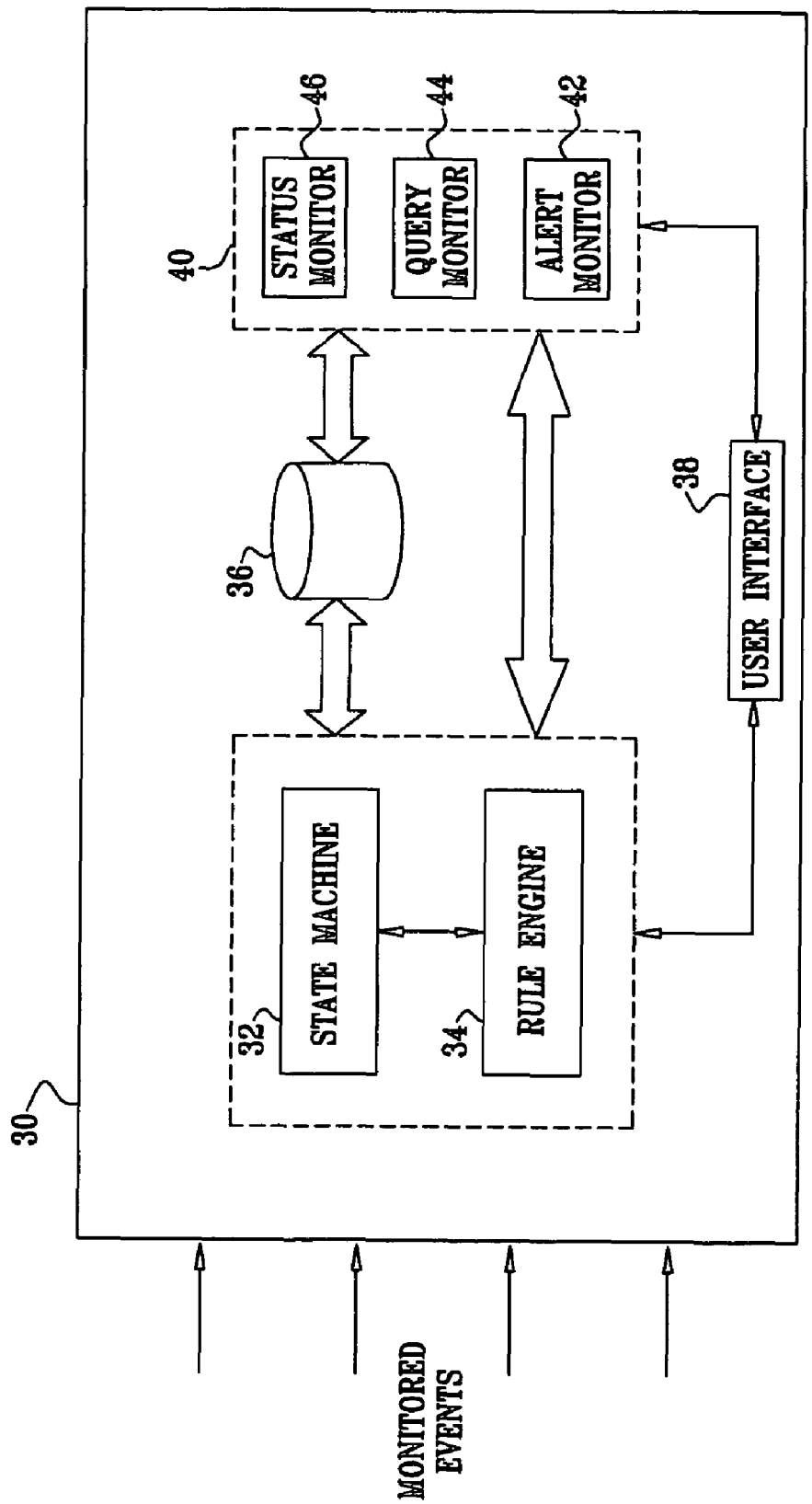
FIG. 2 is a block diagram that schematically illustrates a transaction flow monitor, in accordance with an embodiment of the present invention.

FIG. 2 is a block diagram that schematically illustrates a transaction flow monitor 30, in accordance with an embodiment of the present invention. Monitor 30 monitors the flow of financial transactions through system 24 on two levels—the individual transaction level and the business performance level. This dual-level monitoring is performed using a state machine 32 and a rule engine 34, which jointly analyze the reported events from system 24, correlate them with information regarding the business process, and generate alerts and other information. Using the alerts and information generated by the state machine and the rule engine, monitor 30 provides the user with transaction-level alerts, business-level alerts, status information and answers to queries, as will be explained and demonstrated below.

Monitor 30 comprises a presentation layer 40, typically comprising an alert monitor 42, a query monitor 44 and a status monitor 46. These elements provide the means for presenting alerts, statistics and other information to the user, for accepting queries from the user and presenting their results, and for general status monitoring of the transaction flow through system 24. Exemplary query monitor and status monitor user interfaces are shown in FIGS. 5 and 6, respectively.

Alert monitor 42 presents the user with information such as alerts, SLA violations, exceptions, statistics and deviations from expected KPI values. In some embodiments, the information is displayed in a real-time manner, as soon as it is available. The alert monitor typically displays system-level and/or business-level information produced by rule engine 34, although in some embodiments it can also display information produced by state machine 32.

In some embodiments, detected alerts are also sent to components of system 24 or to components external to system 24 for further processing. Such further processing may comprise, for example, taking corrective actions for solving detected problems, or for preventing problems from becoming more severe.

Query monitor 44 typically presents the user with a list of query templates. In some embodiments, the query templates comprise plain language text queries with parameters. The user selects a particular template from the list, sets values of the query parameters and runs the query. Query results are typically displayed in a separate window. In some embodiments, the query templates are defined in text files that can be easily modified by the user.

Status monitor 46 presents to the user an overall status of the transactions that are currently being processed in system 24, including current KPI values. In some embodiments, the status monitor is customizable, allowing the user to select the information to be displayed and to configure the presentation format.

The user uses a user interface 38 for defining the different functions of monitor 30, for viewing information and for performing different actions. The user interface is used, for example, for defining the state machine model, configuring the rule engine, defining and viewing alerts using alert monitor 42, defining and performing queries using query monitor 44, and selecting and customizing information to be presented by status monitor 46. Additionally or alternatively, user interface 38 can also be used to perform any other human interaction with monitor 30.

In some embodiments, the state machine, rule engine and presentation layer, as well as the general configuration of monitor 30 and user interface 38, are defined and configured using a declarative language, such as an extensible markup language (XML), without the need to write dedicated software code. Alternatively, any other suitable configuration mechanism can be used.

Figure 4:
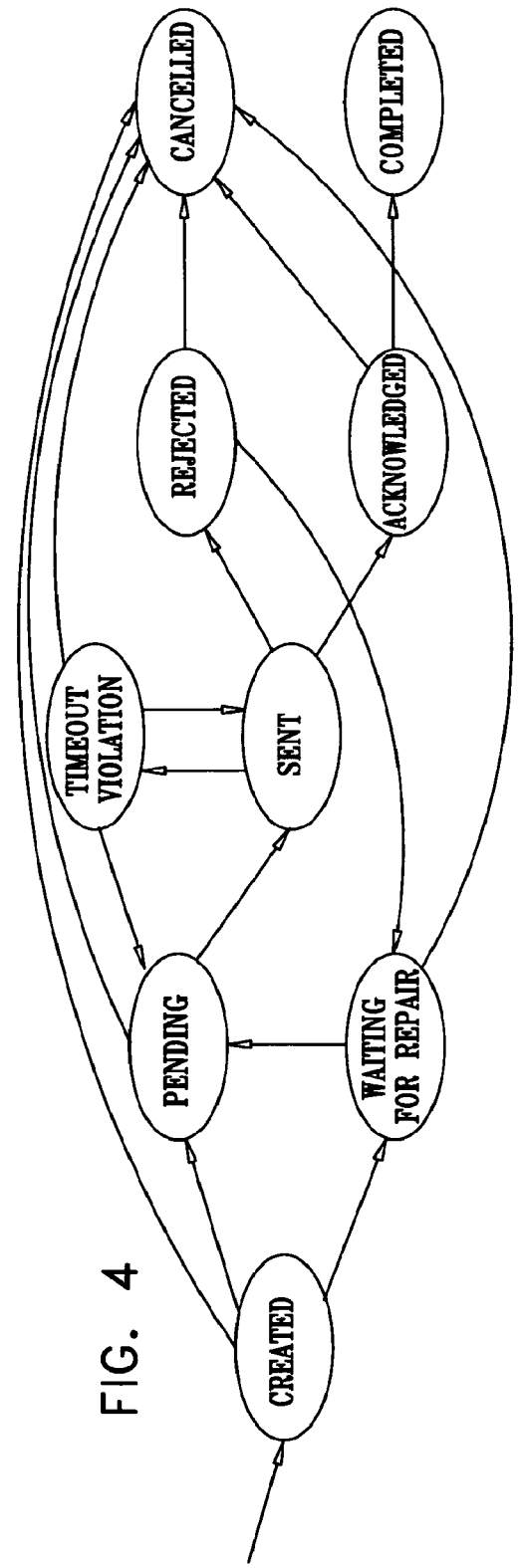
FIG. 4 is a state diagram that schematically illustrates a state machine model, in accordance with an embodiment of the present invention.

State machine 32 uses the monitored events, as well as inputs from the rule engine, to track the status of individual transactions as they are being processed by system 24. A state machine model represents the flow of transactions through system 24 in terms of transaction states and state transitions. The state machine model is typically represented as a graph, whose nodes represent the transaction states. Arcs connecting the nodes represent legitimate state transitions in the system. An exemplary state machine model is shown in FIG. 4 below.

Transitions between transaction states can be triggered by incoming events from system 24, or by business-level events generated by rule engine 34. The transaction states and state transitions are typically defined in advance by a human designer, in accordance with the transaction handling process carried out by system 24. The designer defines the different transaction states and legitimate state transitions.

The definition, or declaration, of each transition in the state machine model typically comprises an origin state, a target state, and a definition of one or more events that trigger this transition. Optionally, the definition may also include one or more conditions that indicate whether this transition is taken or not upon occurrence of the triggering events, as well as validity checks. The state machine definition also comprises a definition of the transaction data fields that need to be stored and updated during the transaction processing.

At runtime, state machine 32 evaluates the validity checks. Typically, whenever a validity check fails, state machine 32 generates a transaction lifecycle alert and sends it to both presentation layer 40 and rule engine 34. In some embodiments, some validity checks can also be designed to "fail silently," i.e., fail without generating an alert.

Transaction lifecycle alerts may comprise, for example, the following:

Timeout alert—a transaction is waiting for an external event or an "end of process" event for more than a predefined time limit.

Event inconsistency alert—inconsistency is detected between different monitored events relating to the same transaction.

Event constraint alert—value restrictions based on the incoming message only. (See explanation and examples below.)

Data constraint alert—restriction based on the incoming events and database queries. (See explanation and examples below.)

At runtime, state machine 32 tracks the status of each individual transaction being processed by system 24. For each transaction, state machine 32 stores and maintains a corresponding transaction record in a transaction database 36. The transaction record holds the current state of the transaction and any transaction data fields declared in the state machine definition. Typically, state machine 32 creates a new transaction record for each transaction that enters system 24, and deletes the record once the transaction is completed.

Rule engine 34 accepts as input incoming events from components 28 of system 24 and transaction lifecycle alerts from state machine 32, as well as event notifications external to system 24, all relating to the transaction processing. The rule engine implements a rule-based model comprising business rules, which correlate the various inputs to detect business-level events and alerts. These events are typically high-level events that are related to the overall process, not to any individual transaction. In some embodiments, business-level events can also have time-dependent triggers and dependencies. In other words, some business rules may depend upon the time-of-day, the time remaining until the end of the business day, the day of the month, etc.

Business-level events may comprise, for example, business-level problems, SLA violations and anticipated violations, and deviations or anticipated deviations from expected KPI values. Business-level alerts can also be generated in response to problems external to system 24, such as a low rate of incoming transactions or a slow response time of central authority 26. Business-level alerts can also identify system-level application problems, such as a high number of transactions pending in a specific queue. The rule engine also provides statistical information that relates to the transaction processing. An exemplary business rule engine is described in U.S. patent application Ser. No. 10/696,512, filed Oct. 29, 2003, and published as U.S. Patent Application Publication 2005/0096949 A1.

In some embodiments, the rule engine queries a database or other data structure in system 24 to obtain information required for evaluating a business rule. For example, a transaction may be given high priority if it originates from a client classified as an important client. A business-level alert may be generated if a transaction of an important client is delayed for more than a predefined duration. The rule engine typically verifies such classification of clients by querying a suitable data structure in system 24.

In some embodiments, the rules in rule engine 34 are defined using a dedicated language and a dedicated graphical user interface (GUI), which may be part of user interface 38. Typically, no software code needs to be written in the rule definition process, so that rules can be defined, tested and updated by non-technical staff, such as business consultants.

In some embodiments, there is close interaction between the operation of state machine 32 and rule engine 34. In some cases, the rule engine is affected by alerts generated by the state machine. For example, if the state machine remains in the same state for longer than a predefined timeout, a timeout alert is generated by the state machine and sent to the rule engine. The rule engine can combine this alert with additional information related to the business process to form more sophisticated business-level events and alerts.

For example, a business rule may define that if a transaction request remains in an "ARRIVED" state in the state machine (meaning it has arrived and is waiting to be processed) for more than two hours, and it is classified as an urgent request, an alert is generated. Another exemplary rule can state that if an urgent request remains in the "ARRIVED" state for more than one hour and the time of day is approaching two hours before the end of the business day, an alert is generated.

In some cases, state transitions in state machine 32 are triggered by business-level events. For example, consider a state machine model that tracks client transaction requests. The state machine comprises states indicating the status of the request, such as "ARRIVED," "ASSIGNED," "APPROVED," or "REJECTED." Assume that system 24 is a legacy system having a hard-coded built-in rule stating that any client is allowed a maximum of three requests per business day. During normal operation, if a fourth request arrives from a particular client during the same day, system 24 automatically identifies the violation and rejects the fourth request.

In some cases, however, it may be desirable to circumvent this hard-coded limitation, for example in the case of a client classified as an important client. In such a case, the rule engine can identify the fact that a fourth request has arrived and was rejected. If the client is defined as important, rule engine 34 generates a business-level event that causes state machine 32 to move to a "REJECTED—INTERVENTION NEEDED" state. The same business-level event is also sent to presentation layer 40, so that user intervention can be requested.

In some embodiments, presentation layer 40 can combine information generated by the state machine and the rule engine to provide meaningful alerts, statistics and status information to the user. This presentation is another example of the close interaction between state machine 32 and rule engine 34. For example, presentation layer 40 can present the percentage or number of transactions that are pending in system 24 for long periods of time, potentially violating service level agreements. This information, generated by the state machine, can be combined with information from the rule engine. For example, SLA violations can be displayed using a different color when approaching the end of the business day, or when the pending transactions are preventing other transactions from being processed.

Transaction Flow Monitoring Method Description

Figure 3:
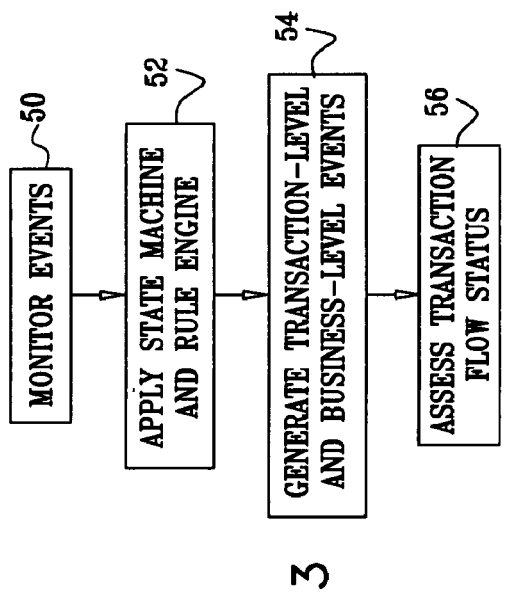
FIG. 3 is a flow chart that schematically illustrates a method for transaction flow monitoring, in accordance with an embodiment of the present invention.

FIG. 3 is a flow chart that schematically illustrates the method for transaction flow monitoring described above, in accordance with an embodiment of the present invention. Transaction flow monitor 30 continuously monitors events reported by components 28 of system 24, at a monitoring step 50. Monitor 30 jointly applies state machine 32 and rule engine 34 to the monitored events, at a model application step 52. The state machine and rule engine jointly analyze the monitored events and generate respective transaction-level events and business-level events, at an event generation step 54. Monitor 30 uses the transaction-level and business-level events to assess the status of the flow of transactions through system 24, at an assessment step 56. The results of the assessment are typically presented to the user.

Exemplary Implementation

The following section describes an exemplary transaction flow monitoring system, for demonstrating the monitoring methods and systems disclosed herein. In the present example, financial computer system 24 belongs to a custodian bank, and central authority 26 is the Federal Reserve Bank (FRB). Clients of the custodian bank perform financial transactions, typically stock trading transactions.

In a typical transaction flow, system 24 receives a new transaction through a branch of the custodian bank comprising a security order request from a client. After performing certain checks, system 24 sends the order request to the FRB. When the FRB receives the order request, it can either accept the order and return an acknowledgement message, or it can decline the order and send a rejection message. Transaction flow monitor 30 monitors the process from the point of view of the custodian bank.

FIG. 4 is a state diagram that schematically illustrates state machine 32 in monitor 30 of the present example, in accordance with an embodiment of the present invention. The structure of the state machine of FIG. 4 is predefined by a human designer using user interface 38, and is derived from the specific business process defined between the custodian bank and the FRB.

The state machine monitors events in system 24 and tracks the flow of order requests through the various transaction states and state transitions. As a request is processed by system 24, events indicating the progress of the process are monitored by the state machine. The state machine moves from one transaction state to another, in response to the monitored events.

For example, when a new order request is submitted, the state machine enters a "CREATED" state. While the request is waiting to be validated or otherwise processed, the state machine is in a "PENDING" state. When the request is sent to the FRB, the state machine moves to a "SENT" state. The FRB subsequently responds by acknowledging or rejecting the order request. The state machine moves to an "ACKNOWLEDGED" state or to a "REJECTED" state, accordingly. If the FRB accepts the order, the request is completed (i.e., approved, performed, with an acknowledgement message sent to the client), in which case the state machine terminates in a "COMPLETED" state. Alternatively, if the FRB declines the order, the request is cancelled, a rejection message is sent to the client, and the state machine terminates in a "CANCELLED" state.

The state machine detects violations in the processing of the order requests. For example, a "WAITING FOR REPAIR" state corresponds to situations in which the request has to be modified before it can be further processed. Modifications may be required, for example, if system 24 finds errors in the submitted request after the request enters the "CREATED" state. Modification may also be required if the request is rejected by the FRB. The modified request may be re-submitted, in which case the state machine moves to the "PENDING" state.

Another type of process violation is timeout violations. For example, a "TIMEOUT VIOLATION" state in FIG. 4 tracks situations in which the FRB does not respond within a pre-determined time interval. In other embodiments (not shown), the "TIMEOUT VIOLATION" state can also track situations in which a request is "PENDING" to be sent to the FRB or to be otherwise processed for an extended period of time.

The state machine stores the current status of each order request in transaction database 36. In the present example, the state machine stores the following attributes for each processed order request in system 24: ID, state, security symbol, security price, volume, price, account ID, client ID, client name.

Several transaction-level events or transaction life-cycle alerts are defined in the present example for implementation by the state machine model:

CLIENT CREDIT BREACH ALERT/URGENT CLIENT CREDIT BREACH ALERT: An alert is generated if the processing of an order request is expected to exceed the client credit limit. The alert is classified as urgent if the time-of-day is approaching FRB closing time. This is an example of a "data constraint alert," as defined above.

WAITING CREDIT ALERT: An alert is generated if a message is waiting to be handled by a compliance officer due to insufficient credit, and the time-of-day is approaching fifteen minutes before FRB closing time.

FRB TIMEOUT ALERT: An alert is generated if no acknowledgement or rejection is received from the FRB within one hour from sending the request.

ACKNOWLEDGE VOLUME ALERT: An alert is generated if the volume indicated by the FRB acknowledgement does not match the volume in the order request.

TRADE UNMATCHED VALUES: An alert is generated if an order request contains contradicting values (e.g., the order price is not equal to the product of the security price and the requested volume). This is an example of an "event constraint alert," as defined above.

In addition to the state machine model, the exemplary system also comprises a rule engine that detects business-level events. The following business-level alerts are generated by the rule engine:

ABNORMAL BRANCH VOLUME ALERT. An alert is generated if an abnormal number of requests is received from a specific branch of the custodian bank within the first two hours of business. An abnormal number of transactions from a particular branch often indicates a communication problem.

PLATINUM CLIENT REJECT ALERT. An alert is generated if three rejections are received from the FRB, within a single business day, for order requests of a certain "platinum" client (i.e., a client with a high credit limit or other special privileges).

REJECT RATE ALERT. An alert is generated if the number of rejected order requests in the last hour deviates from the normal value by more than 25%.

BUILDUP WORK ALERT. An alert is generated if an unexpectedly high number of requests require human intervention at a specific processing stage.

FIG. 5 is a diagram that schematically illustrates parts of user interface 38 of query monitor of the present example, in accordance with an embodiment of the present invention. A window 58, which is part of user interface 38, displays the information related to queries. A query manager sub-window 60 displays a drop-down list of predefined query templates, which can be selected and configured by the user. A query result sub-window 62 displays the query results. In the example of FIG. 5, the query results comprise a list of order requests that are waiting for manual repair. For each order request on the list, the query monitor displays the transaction ID, transaction state, the dollar amount of the request, as well as other transaction attributes.

Query monitor 44 of the present example comprises several predefined query templates:

A template querying the number and the total dollar amount of order requests that are currently in a particular processing stage.

A template querying the list of order requests of a particular client that are currently in a particular processing stage.

A template querying the order request details (including processing stage) for a particular client.

A template querying the reasons for rejection of order requests of a particular client.

A template querying the number and the total dollar amount of order requests rejected for a particular rejection reason.

FIG. 6 is a diagram that schematically illustrates other parts of user interface 38 of status monitor 46 of the present example, in accordance with an embodiment of the present invention. Status monitor 46 presents the user with the overall status of the order requests that are currently being processed in system 24. A window 63, which is part of user interface 38, displays the status information.

A transaction state sub-window 64 displays a statistical analysis of the order requests. The sub-window displays the number, percentage and total dollar value of the order requests in the system, grouped into several processing stages of interest. An SLA violation sub-window 66 displays the number and total dollar value of order requests that violate service level agreements, for several processing stages of interest.

Although the methods and systems described above mainly address monitoring of financial transactions between clients and financial institutions, the principles of the present invention may also be used in other transaction-related applications. Such applications may comprise various e-commerce applications, credit card verification systems, on-line airline reservation systems, lottery and gaming systems, etc.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. Apparatus for monitoring transactions in a computer system, comprising:
a processor, which is arranged to monitor events reported by components of the computer system responsively to a flow of the transactions through the system, to apply a state machine model to the monitored events so as to identify transaction-level events, to apply a rule-based model to the monitored events so as to identify business-level events, to perform at least one action selected from a group of actions consisting of modifying, responsively to at least one of the business-level events identified by the rule-based model, a first criterion applied by the state machine model in identifying one or more of the transaction-level events, and modifying, responsively to at least one of the transaction-level events identified by the state machine model, a second criterion applied by the rule-based model in identifying one or more of the business-level events, and to assess a status of the flow of the transactions responsively to the transaction-level events and the business-level events; and a user interface, which is arranged to interact with a user so as to permit the user to configure the state machine model and the rule-based model and to present the assessed status to the user.

2. The apparatus according to claim 1, wherein the transactions comprise financial transactions.

3. The apparatus according to claim 1, wherein the processor and user interface are external to the components of the computer system that perform the transactions, and are arranged to accept the monitored events exported from the components of the computer system.

4. The apparatus according to claim 1, wherein the processor is arranged to monitor the events by performing at least one action selected from a group of actions consisting of accepting events reported using built-in mechanisms of the components, accepting events reported by one or more monitoring agents incorporated into some of the components, and monitoring interfaces between some of the components.

5. The apparatus according to claim 1, wherein the user interface is arranged to permit the user to perform at least one action selected from a group of actions consisting of configuring the state machine model, configuring the rule-based model, configuring queries for information and configuring information to be presented to a user, by using a declarative language.

6. The apparatus according to claim 1, wherein the processor is arranged to accept definitions of transaction states representing a status of a monitored transaction in the flow, definitions of state transitions connecting between the transaction states, and definitions of transaction data comprising information relating to the monitored transaction.

7. The apparatus according to claim 6, wherein the definitions of the state transitions comprise a definition of a triggering event that triggers the state transition responsively to at least one of the monitored events and the business-level events identified by the rule-based model, and wherein the processor is arranged to update the transaction state of the monitored transaction responsively to an occurrence of the corresponding triggering event.

8. The apparatus according to claim 7, wherein the definitions of the state transitions comprise a definition of a validity check, and wherein the processor is arranged to generate a transaction lifecycle alert responsively to a failure in the validity check of the corresponding state transition.

9. The apparatus according to claim 8, wherein the transaction lifecycle alert comprises at least one alert type selected from a group of types consisting of a timeout alert, an event inconsistency alert, an event constraint alert and a data constraint alert.

10. The apparatus according to claim 1, wherein the processor is arranged to apply the rule-based model by performing at least one action selected from a group of actions consisting of detecting service level agreement (SLA) violation, anticipating the SLA violation, detecting a deviation from an expected key performance indicator (KPI) value, anticipating the deviation from the expected KPI value, detecting a problem related to the flow external to the computer system, and identifying a system-level problem in one or more of the components of the computer system.

11. The apparatus according to claim 1, wherein the processor is arranged to apply a predefined business rule to at least one of the monitored events and the transaction-level events identified by the state machine model, and to identify at least a given business-level event responsively to the evaluated business rule.

12. The apparatus according to claim 1, wherein the processor is arranged to detect an undesired condition comprising at least one condition type selected from a group of types consisting of a service level agreement (SLA) violation, an anticipated SLA violation, a hardware problem in one or more of the components, an anticipated hardware problem, a capacity bottleneck in the flow, an anticipated capacity bottleneck, a deviation from an expected key performance indicator (KPI) value and an anticipated deviation from the expected KPI value.

13. The apparatus according to claim 12, wherein the processor is arranged to generate an alert to a user responsively to the detected undesired condition.

14. The apparatus according to claim 1, wherein the processor is arranged to define a query using a query template and to address the query to at least one of the state machine model and the rule-based model for information related to the flow, so as to assess the status.

15. The apparatus according to claim 1, wherein the processor is arranged to assess the status by performing at least one action selected from a group of actions consisting of calculating and presenting statistical information related to the flow, and calculating and presenting information relating to a key performance indicator (KPI).

16. A computer software product for monitoring transactions in a computerized system, the product comprising a computer-readable medium, in which program instructions are stored, which instructions, when read by a computer, cause the computer to monitor events reported by components of the computerized system responsively to a flow of the transactions through the system, to apply a state machine model to the monitored events so as to identify transaction-level events, to apply a rule-based model to the monitored events so as to identify business-level events, to apply a rule-based model to the monitored events so as to identify business-level events, to perform at least one action selected from a group of actions consisting of modifying, responsively to at least one of the business-level events identified by the rule-based model, a first criterion applied by the state machine model in identifying one or more of the transaction-level events, and modifying, responsively to at least one of the transaction-level events identified by the state machine model, a second criterion applied by the rule-based model in identifying one or more of the business-level events, and to assess a status of the flow of the transactions responsively to the transaction-level events and the business-level events.

17. A financial transaction processing network, comprising:

a financial computer system, comprising components that are arranged to process financial transactions and to report events responsively to a flow of the transactions through the system; and a transaction flow monitor, which is arranged to monitor the events reported by the components of the computer system, to apply a state machine model to the monitored events so as to identify respective transaction-level events, to apply a rule-based model to the monitored events so as to identify business-level events, to perform at least one action selected from a group of actions consisting of modifying, responsively to at least one of the business-level events identified by the rule-based model, a first criterion applied by the state machine model in identifying one or more of the transaction-level events, and modifying, responsively to at least one of the transaction-level events identified by the state machine model, a second criterion applied by the rule-based model in identifying one or more of the business-level events, and to assess a status of the flow of the transactions responsively to the transaction-level events and the business-level events.

18. The apparatus according to claim 1, wherein the processor is arranged to modify the first criterion by defining in the state machine model a state transition condition that depends on the at least one of the business-level events.

19. The apparatus according to claim 1, wherein the processor is arranged to modify the second criterion by defining in the rule-based model a rule that depends on the at least one of the transaction-level events.

* * * * *